No. 771,091. PATENTED SEPT. 27, 1904.
J. R. PUMPHREY.
BALING PRESS.
APPLICATION FILED OCT. 24, 1903.
NO MODEL.
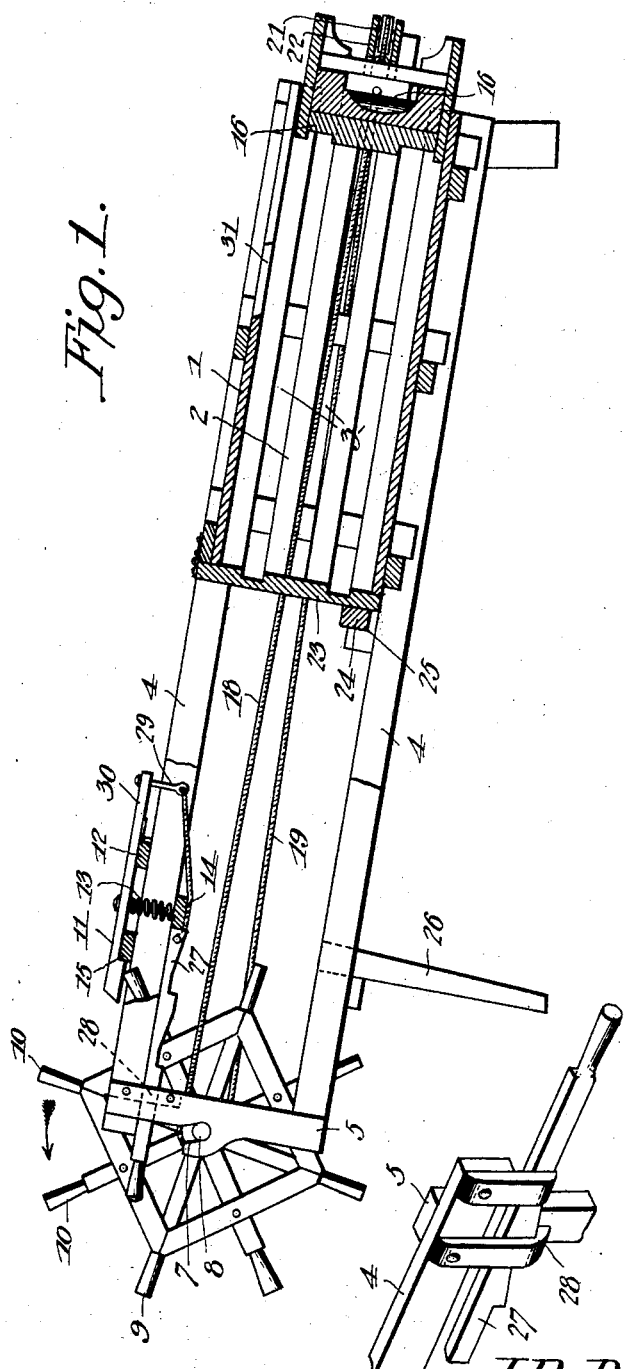

No. 771,091.

Patented September 27, 1904.

UNITED STATES PATENT OFFICE.

JAMES RALEIGH PUMPHREY, OF CHIPLEY, FLORIDA.

BALING-PRESS.

SPECIFICATION forming part of Letters Patent No. 771,091, dated September 27, 1904.

Application filed October 24, 1903. Serial No. 178,445. (No model.)

*To all whom it may concern:*

Be it known that I, JAMES RALEIGH PUMPHREY, a citizen of the United States, residing at Chipley, in the county of Washington and State of Florida, have invented a new and useful Baling-Press, of which the following is a specification.

This invention relates to baling-presses, and one of the objects thereof is to simplify the construction and operation of the press.

A further object is to provide an improved operating mechanism including means for throwing the mechanism into and out of operative position.

Another object is to facilitate the expulsion of the finished bale as well as to provide for an easy insertion of the material in the compression-chamber.

Further objects and advantages of this invention will appear in the following description and the novel features thereof will be particularly pointed out in the appended claims, it being understood that changes in the form, proportion, and the minor details of construction may be resorted to without departing from the spirit or sacrificing any of the advantages of this invention.

In the drawings, Figure 1 represents a side elevation of the baling-press, the compression-chambers and follower being shown in section. Fig. 2 is a top plan view of the press, the compression-chamber and the follower being shown in section; and Fig. 3 is a detailed perspective view of the slide-bar for throwing the operating mechanism into and out of gear.

Referring now to the drawings by numerals of reference, 1 designates the bale-box, having the top, bottom, and sides, and in the forward end of which is the compression-chamber 2. The sides are slatted to provide slots 3, whereby the bale-bands may be inserted.

4 designates the side beams of the press, of which there are four, carried at the respective longitudinal edges of the box and extending a considerable distance beyond the front of the box 1, so that the follower-operating mechanism will be a sufficient distance away from the box to permit the removal of the bale, as will be presently explained. The top and bottom beams on each side of the box are connected by vertical standards 5 and 6, in which slots 7 are provided forming bearings for the horizontally-disposed winding-shaft 8. This shaft 8 is rotated by a hand-wheel 9, having a plurality of radially-disposed spokes or handles 10, which serve a double purpose—namely, as a means for engagement by the operator whereby the wheel may be manually rotated and as ratchets for engagement by the spring-controlled dog 11, hinged to the cross-beam 12 on the top beams 4. The dog 11 is normally held in operative position by the spring 13, connected thereto and to the beam 14, so that the tendency will be to rest upon the stop 15, which limits the movement thereof. As the dog rests upon the stop 15, it will be necessary for the handles 10 to successively raise it, during which action the tension of the spring will be overcome only to permit the passage of the handle, and after each handle is passed the dog will again drop back into position against the stop.

The follower 16, which is actuated by the shaft 8, is provided with a head rounded at 17, around which a rope or cord 18 passes, the respective ends of which are connected to the shaft 8. By rotating the shaft 8 through the medium of the hand-wheel the rope or cord 18 will be wound upon the shaft so as to move the follower toward the compression-chamber to form the bale. The retraction of the follower can be effected by reversing the wheel so as to unwind the cord 18 and wind a cord 19 on the extended end 20 of the shaft. This cord 19 is also connected to the end of the follower after passing around a pulley 21, carried in the sheave 22 at the rear end of the bale-box.

The forward end of the compression-chamber is normally closed by a hinged door 23, which is held closed by a bar 24, terminally engaging notches 25, provided in supplemental beams fixedly carried by the lower beams 4; but after the bale has been pressed the bar 24 can be removed and the door swung open, so that by turning the hand-wheel slightly the follower can be moved up to the opening, so as to expel the bale, which will be shoved out between the box and the operating mechanism, whereby it can easily be moved to one side. The removal of the bale will be easily accomplished, due to the inclination of the press effected by the legs or standards 26, which are illustrated as being immediately beneath the operating mechanism. By raising the forward end of the press the bale can be dropped to rest beneath the lower beams 4 and rolled or otherwise removed from the press.

A mechanism is provided for throwing the dog into and out of operative position, and this mechanism is illustrated as comprising a longitudinally-sliding notched bar 27, movable in a clutch-loop 28, capable of being engaged by one of the notches in the bar. One end of the bar is connected to a depending projection or pin 29, carried by the projecting arm 30 of the dog, so that the dog will be thrown into or out of operative engagement with the handles, according to the position of the bar. When the bale has been formed and it is desirable to retract the follower within the compression-chamber, the bar 27 will be pulled forward to raise the handle-engaging end of the dog out of contact with the wheel, and by reversing the wheel the follower can be returned to a position opposite to the intake-opening 31, so that the material may be properly fed for another bale.

What I claim, and desire to secure by Letters Patent, is—

1. A baling-press having a follower-operating mechanism, comprising a winding-shaft, an operating-wheel on the shaft, provided with handles constituting ratchets, a spring-pressed dog for engaging said ratchets, and a sliding bar carried by the press and connected to the dog to throw it out of engagement with the ratchets.

2. A baling-press having a follower-operating mechanism, comprising a winding-shaft, an operating-wheel having ratchets, a dog for engaging the handles constituting ratchets, a depending projection on the dog and a sliding bar connected to the projection and provided with a handle to permit the dog to be lifted out of engagement with the ratchets.

In testimony that I claim the foregoing as my own I have hereto affixed my signature in the presence of two witnesses.

JAMES RALEIGH PUMPHREY.

Witnesses:
A. B. CRUTCHFIELD,
J. T. WHITAKER.